United States Patent [19]

Draper et al.

[11] Patent Number: 4,578,732

[45] Date of Patent: Mar. 25, 1986

[54] GROUND FAULT CIRCUIT INTERRUPTER INCLUDING SNAP-ACTING CONTACTS

[75] Inventors: Charles W. Draper, Palm Harbor, Fla.; Terry E. Franks, Leicester, N.C.

[73] Assignee: Square D Company, Palatine, Ill.

[21] Appl. No.: 561,608

[22] Filed: Dec. 14, 1983

[51] Int. Cl.⁴ .................... H02H 3/28; H01H 83/02
[52] U.S. Cl. ..................................... 361/45; 335/18; 335/188
[58] Field of Search ............... 335/18, 188; 361/42, 361/56, 45

[56] References Cited

U.S. PATENT DOCUMENTS 4,013,929 3/1977 Dietz et al. ........................... 361/42
4,263,637 4/1981 Draper et al. ........................ 361/56
4,409,574 10/1983 Misencik et al. ..................... 335/18

Primary Examiner—Harold Broome

Attorney, Agent, or Firm—William H. Schmeling; A. Sidney Johnston

[57] ABSTRACT

A wall socket type ground fault circuit interrupter having a pair of sockets, a reset button and a test button that are accessible from the front of the interrupter. The interrupter has latched snap-acting contacts and a novel latching relay structure for releasably maintaining the snap-acting contacts in a circuit making position. The snap-acting contacts permit all of the components including the monitoring toroids and the power supply to be respectively located and connected at the load side of the snap-acting contacts so that all of the circuits of the interrupter are deenergized when the contacts snap to a circuit opening position. The snap-acting contact mechanism and relay are provided with structures which provides the interrupter with a trip-free mode of contact actuation and accordingly a tease-proof snap-acting contact operation.

13 Claims, 8 Drawing Figures

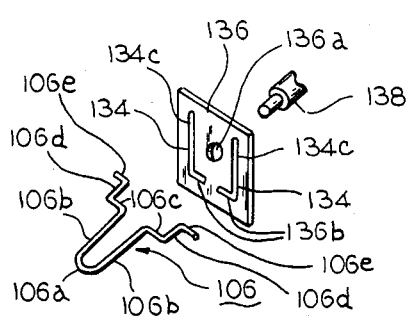
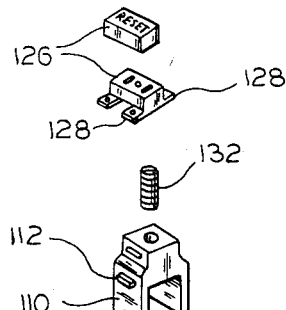
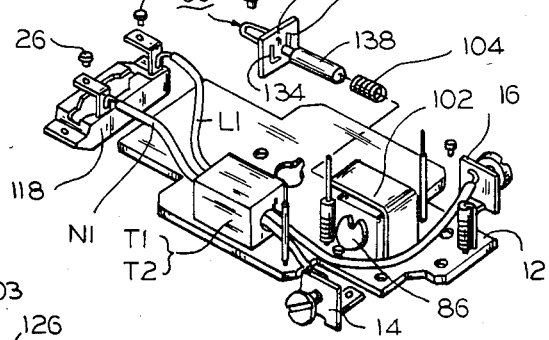
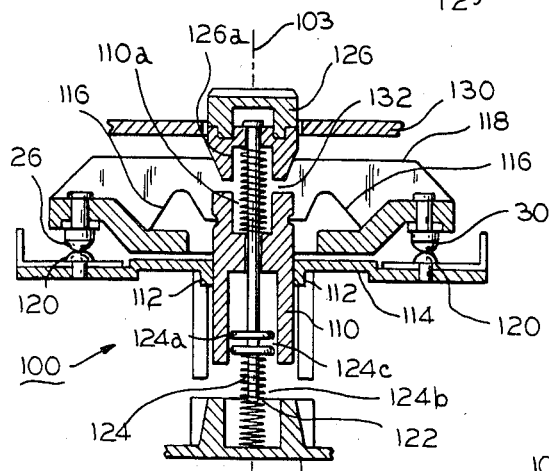
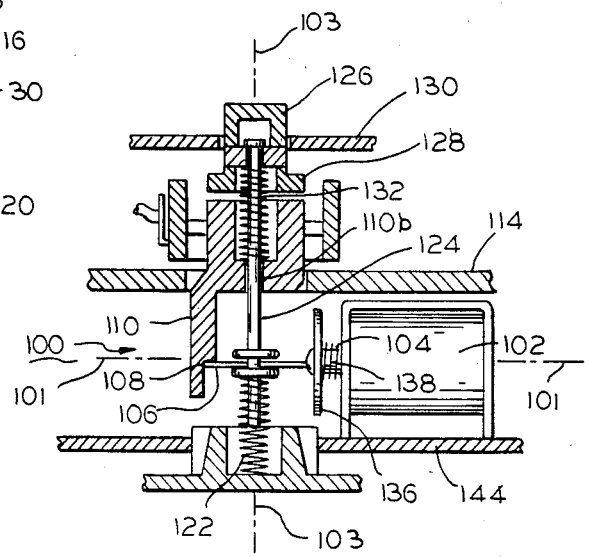

GROUND FAULT CIRCUIT INTERRUPTER INCLUDING SNAP-ACTING CONTACTS

This invention relates to ground fault circuit interrupters and more particularly to a ground fault circuit interrupter structure and circuit that includes snap-acting circuit making and breaking contacts.

BACKGROUND OF THE INVENTION

Established Standards promulgated by code making authorities relating to devices or modules commercially known as receptacle type Ground Fault Circuit Interrupters and hereinafter designated as GFCIs that are installed in wall receptacles require the GFCI to be a two-pole device. This requirement exists to assure that a ground fault between a line conductor and ground will be cleared in event the GFCI is miswired, i.e., the line and neutral conductors are reversed at the input terminals of the device. Compliance with the standard is commonly achieved by the use of mechanically latched, magnetically operated mechanisms in GFCI receptacles. This type of mechanism requires power to unlatch and trip the devices because GFCI are commonly permanently installed and wiring continuity can thus be assured.

Safety considerations require that GFCI mechanisms be non-teasable or trip free as a situation can be postulated in which the GFCI mechanism is held in a position where the hot line is conductive while the neutral line is open. This type of condition is transient as the condition must be maintained by an external force. In mechanisms of this type if the electronics and the disconnect means are powered downstream from the trip mechanism, a ground fault on the load side of the GFCI may be present while the GFCI is without power to interrupt the circuit in which it is installed.

Two methods are presently used to overcome the problem. Both methods are effective but include certain disadvantages.

Coil Clearing Contacts: Coil clearing contacts allow the electronic and disconnect mechanism in the GFCI to be powered from the line side of the power contacts. This assures that the GFCI will have power to trip even though the neutral contact may be teased open. The coil clearing contact is synchronized so that it opens after both line contacts open and closes before the line contacts close. This assures that the GFCI is always supplied with power during any situation where a ground fault may be present. It follows that it is necessary that the power from the GFCI be removed after the GFCI is tripped as the steady state current required to trip the GFCI, if uncleared, would damage the GFCI. A major disadvantage of coil clearing contacts is the mechanical complexity required. Coil clearing contacts also decrease the overall reliability of the GFCI. Coil clearing contacts are essentially dry contacts as they conduct only a few milliamperes of power except during the brief interval the GFCI is tripped.

Electronic Commutation: This method is similar to the coil clearing contacts except that the tripping mechanism, normally a thyristor, is connected in the half-wave mode to the line side of the GFCI disconnect contacts. Once a fault is detected, the thyristor is turned on, applies power to the disconnect mechanism, and clears the fault. When the power is disconnected from the fault, the SCR commutates off. Since the fault is no longer present, the thyristor does not subsequently become conductive. The disadvantage of this method is that a failure of the SCR may cause excessive damaging currents in the solenoid coil.

SUMMARY OF THE INVENTION

The present invention relates to a mechanism which is inherently trip free and is thus mechanically unteasable. The mechanism is arranged so that its switching contacts snap closed when its operating reset button is operated and cannot be maintained in an intermediate state through an external means so that the switching contacts are positively open or closed. As the mechanism is trip free and thus unteasable, the electronics and disconnect mechanism may be powered down stream, that is on the load side of the power clearing snap-acting contacts and thus when the mechanism is tripped, power is immediately removed from the GFCI.

The advantages of the present invention are as follows:

Higher reliability through the elimination of the coil-clearing contacts and reduction of attendant mechanical complexity.

If a failure in the electronics causes the GFCI to switch to a tripped state, power is immediately removed from the GFCI upon trip. If a reset is attempted, the mechanism in the GFCI is intact and will reclear the fault and thus enhance the reliability of the GFCI.

Additionally the present invention is concerned with a novel tease proof and trip free contact operating mechanism. The mechanism is tease proof in that the mechanism cannot be teased into a condition where one of the switch contacts is closed while another contact is open. The mechanism additionally is trip free as the mechanism will operate to open its associated circuits when travel of the reset button is prevented as when the button is intentionally held or jammed in an operated position. The advantages achieved by the tease proof trip-free function are the result of a compact latch mechanism which is sized to permit the entire device associated with the latch mechanism to be installed in a shallow commercially sized wall receptacle. The latch mechanism is characterized by its novel structure that includes a slotted plate which provides a coupling between the latch member and the operating solenoid plunger of the device.

It is therefore an object of the present invention to incorporate a novel trip-free, snap-acting switch mechanism in a ground fault current responsive device or module.

An additional object is to provide a ground fault current detecting and switching device with a snap switch mechanism for opening and closing a circuit between an A.C. source having a grounded neutral and an A.C. load with a snap action and to include features within the device which will make the device tease proof.

Another object is to provide a ground fault protective device with a novel solenoid operated latching mechanism and snap-acting contacts which is installed in the device housing to provide the device with a trip-free tease-proof operation.

A further object is to provide a ground fault circuit interrupting device or module with snap-acting contacts that are connected in the circuit between the source and remaining components of the device so that when the contacts are open the power to all components of the device is removed.

And an additional object is to provide a GFCI with a novel trip-free snap-acting contact mechanism that has switching contacts connected between the input terminals and remaining components of the GFCI and to provide the trip-free mechanism with a novel slotted plate that provides an operating connection between a latching member and a solenoid plunger incorporated in the GFCI.

The features of the present invention which are believed to be novel are set forth with particularity in the appended claims. The invention, together with further objects and advantages, may best be understood by reference to the following description taken in conjunction with the accompanying drawings, in the several figures of which like reference numerals identify like elements, and in which:

FIG. 5 is an exploded enlarged view showing in perspective certain components of device in FIG. 1.

FIG. 6 is an exploded enlarged view showing in perspective components of a latch used in the device in FIG. 1.

FIG. 7 and FIG. 8 are enlarged cross-sectional views of the snap switch and trip-rest mechanism used in the device in FIG. 1.

Figures 1, 3, 4:
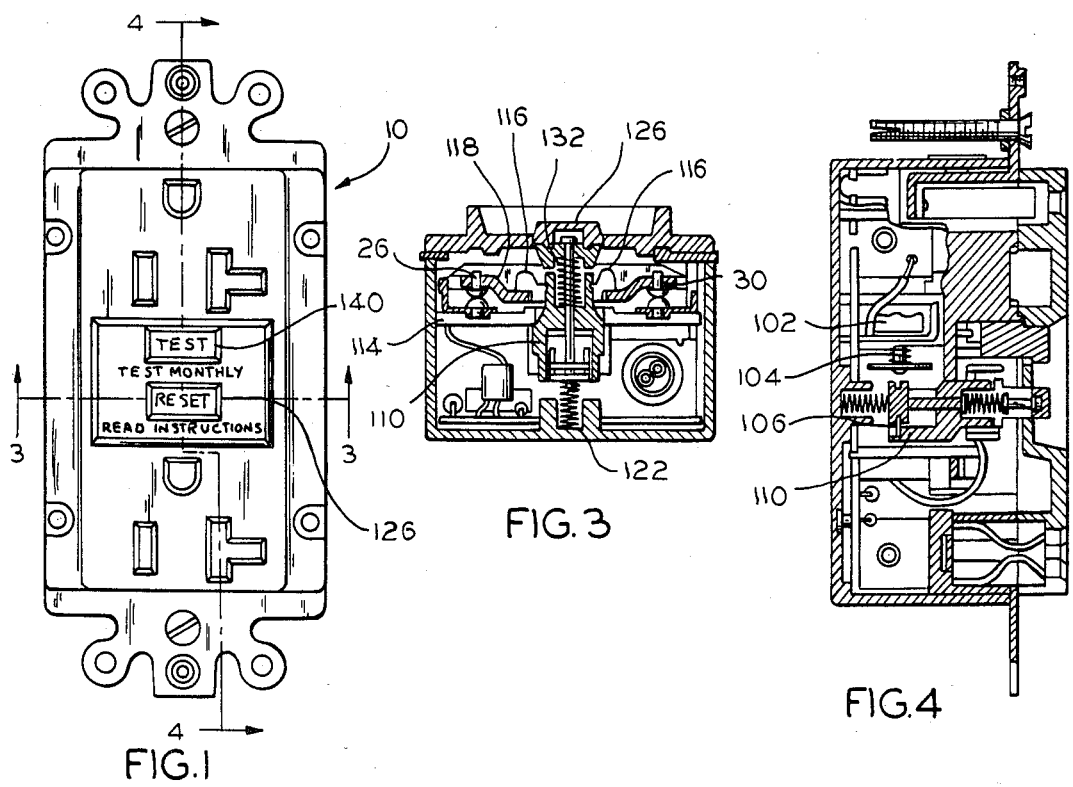
FIG. 1 is a front elevation view of a ground fault protective device incorporating the present invention.
FIG. 3 and FIG. 4 are cross section views respectively taken along lines 3—3 and 4—4 in FIG. 1.

A ground fault circuit interrupter hereinafter designated as GFCI 10 and shown in FIG. 1 is intended for use in shallow depth and standard depth wall junction boxes as disclosed in the Dietz et al U.S. Pat. No. 4,013,929 and includes many of the components more fully shown and described in the Dietz patent. The GFCI 10 includes an electronic circuit and components, as shown in elemental form in FIG. 2 for descriptive purposes, and includes additional components and circuits as are more fully disclosed in an application for U.S. patent entitled "Ground Fault Detection Circuit" Ser. No. 412,454 filed 8-27-82, filed by the inventors Nichols et al. and assigned to the assignee of the present invention. Another circuit suitable for use in connection with the present invention is disclosed in the U.S. Pat. No. 4,263,637 which was granted on Apr. 21, 1981, and assigned by the inventors Charles W. Draper et al to the assignee of the present invention.

Figure 2:
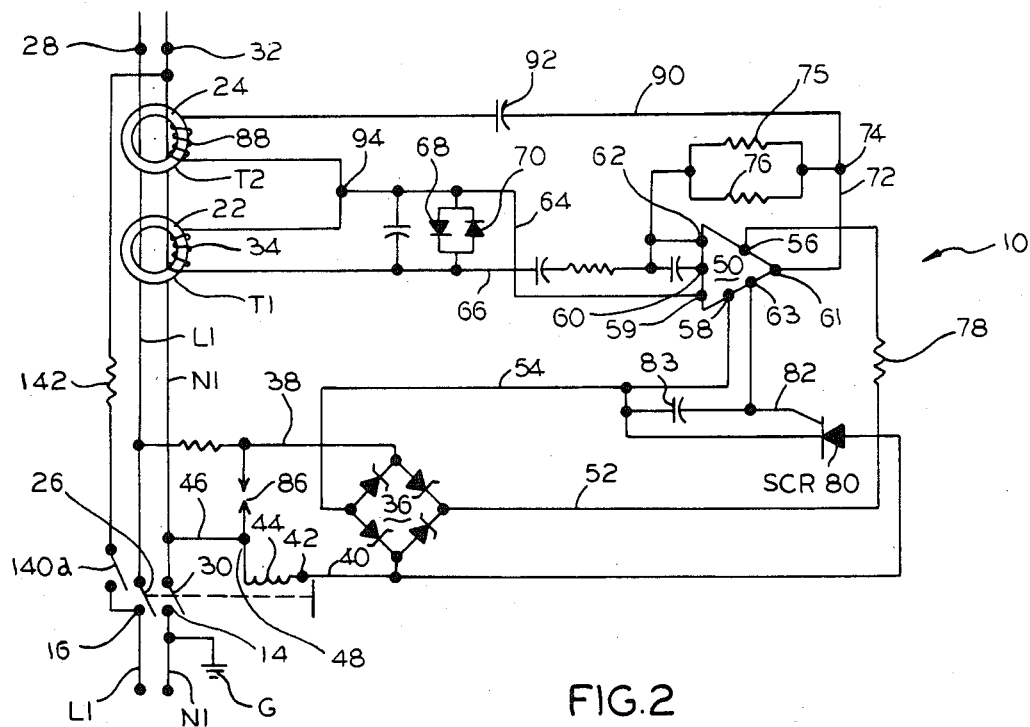
FIG. 2 is a schematic drawing of an electronic circuit used in the device in the preferred embodiment in FIG. 1 and incorporating the present invention.

As shown in FIGS. 2 and 5, the GFCI 10 includes a printed circuit board 12 whereon an electronic and trip-free snap switch components of the GFCI-10 are mounted. A pair of line side terminals 14 and 16 are positioned by the board 12 and are provided for connection to a suitable A.C. source having a neutral conductor N1 connected to a ground G and the terminal 14.

The ground fault sensing and grounded neutral detecting components and the tripping mechanism are mounted on the printed circuit board 12. These include two differential transformers T-1 and T-2 comprising a ground fault sensing toroid 22 and a coupling toroid 24 respectively through which a line conductor L1 and the neutral conductor N1 extend to constitute the primary windings thereof. The conductor L1 is connected through the terminal 16 and a snap-acting contact 26 and passes through the toroids 22 and 24 to an end that is connected to a load side terminal 28. The neutral conductor N1 is connected through the terminal 14 and a snap-acting contact 30 to a lead N1 that passes through the toroids 22 and 24 to an end that is connected to a load terminal 32.

The differential transformer T-1 which includes the toroid 22 functions as a so-called zero sequence transformer to sense the occurrence of a ground fault on the load side of the conductor L1. When no ground fault is present, the magnetic fields resulting from current flow in the conductor L1 in one direction and in the neutral conductor N1 in the opposite direction are of opposite polarity and equal. The magnetic fields thus cancel out. However, when a ground fault occurs in the electrified conductor L1 on the load side of the toroid 24, a portion of the current returns to the source through a ground path rather than through the neutral conductor N1. Thus, the respective magnetic fields of the conductor L1 and the neutral conductor N1 are unbalanced as they pass through the toroid 22 where they constitute the primary winding of the differential transformer. Accordingly the magnetic fields do not cancel out, and a net amount of magnetic flux is available to be picked up in a secondary winding 34 on the toroid 22 and thus induce a voltage signal therein.

The detection and interruption circuit is powered as follows. A full wave bridge 36 having avalanche characteristics is connected across the line conductor L1 and the neutral conductor N1 on the load side of the snap-acting contacts 26 and 30, by means of a conductor 38 that is connected to one side of the bridge 36 and a conductor 40 that is connected to the other side of the bridge 36 and extending to a terminal 42 of a solenoid coil 44. A conductor 46 extends from a solenoid coil terminal 48 to the neutral conductor N1. The bridge 36 provides a rectified power supply for an integrated circuit component or chip 50 through conductors 52 and 54 that are connected to pins 56 and 58 respectively of the chip 50.

The chip 50 includes therein an operational amplifier, a voltage regulator and a level detector. The pins designated 56 and 58 represent the voltage regulator portion, pins designated 59, 60, 61 and 62 represent the operational amplifier portion, and a pin 63 represents the level detector portion of the chip 50.

As stated above, a rectified power supply is fed from bridge 36 to the chip 50 and is connected to pins 56 and 58 which represent the voltage regulator portion of the chip 50 and which sets the appropriate voltage level for the operational amplifier portion of the chip 50. When a ground fault occurs in the line conductor L1, on the load side of the toroid 22, part of the current returns to source through a ground path rather than through a neutral conductor N1, creating an unbalance in the respective magnetic fields of the conductors L1 and N1 where they pass through the toroid 22. As described above, a net amount of magnetic flux is thus available to induce a voltage signal in the secondary winding 34. The voltage signal is transmitted to the operational amplifier stage of chip 50 by way of an input circuit comprising a conductor 64 leading to pin 59 (an inverting input terminal of the operational amplifier stage) in chip 50, and a conductor 66 leading to the pin 62 (a non-inverting input terminal of the operational amplifier stage).

A pair of diodes 68 and 70 connected in parallel with the secondary winding 34 prevent saturation of the transformer toroid core 22 during very high values of ground fault current.

When the induced voltage signal transmitted from the secondary winding 34 is received on the pins 59 and 62 of the chip 50, the signal is transmitted to the output pin 61, from which it flows through a negative feed back path, comprising a conductor 72 to a junction 74 and then to the inverting input 62 through a pair of parallel resistors 75 and 76. The negative feedback path controls the gain of the amplifier stage in the chip 50, and the resistors 75 and 76 are selected to control the magnitude of ground fault trip current. For example, it may be selected so when a 5 milliamps difference is present between the currents in the line conductor L1 and the neutral conductor N1, the amplifier output peak voltage will exceed the reference voltage of the level detector stage that is supplied by the voltage regulator stage. The voltage regulator stage receives a DC voltage supply on the pins 56 and 58 from the bridge 36 through a voltage dropping resistor 78. When the output peak voltage of the amplifier stage exceeds the reference voltage, a D.C. voltage is produced at the pin 63 of the level detector stage which triggers a silicon controlled rectifier (SCR) 80 into conduction.

The D.C. voltage from the pin 63 is fed to the gate of SCR 80 through a conductor 82. A capacitor 83 is connected across the cathode-gate circuit of SCR 80 to prevent the SCR 80 from triggering and tripping the circuit due to noise on the circuit which could be amplified by the chip 50.

When SCR 80 is triggered into conduction, a line voltage is applied to the solenoid coil 44 causing the contacts 26 and 30 to open and interrupt the power line circuit. When SCR 80 conducts, a circuit is completed from the neutral conductor N1 through the conductor 46, the solenoid coil 44, the conductor 40, the conductor 52, the SCR 80, and the conductors 54 and 38.

The full wave rectifier bridge 36 includes zener diodes that are selected to avalanche with a reverse voltage of between 200 and 300 volts peak. If a voltage transient, e.g., a predetermined level of noise voltage in excess of 300 volts peak occurs between conductors L1 and N1 of the power circuit, the diodes of the bridge rectifier 36 will avalanche and clip the voltage to a safe amplitude and thus protect SCR 80 and the chip 50 from damage. The impedance of trip coil 44 acts as a choke to limit current sufficiently on occurrence of high transients to protect the diodes of rectifier 36 from damage. By using a rectification bridge of this type with avalanche or zener diodes, and an additional component such as a spark gap voltage limiter 86, protection from high voltage transients is obtained.

In accordance with this invention, the ground fault protection circuit is powered from the load side of the snap-acting interrupting contacts 26 and 30. In this way, the ground fault protection circuit is de-energized after the power circuit has been interrupted by opening of the snap-acting contacts 26 and 30. In other devices of the type wherein power to the ground fault protective circuit is obtained from the line side, a separate switch is used to de-energize the trip coil after tripping for a ground fault. In the present invention, a separate switch is not needed for this purpose.

The ground fault protection circuit also includes protection against a ground on the neutral conductor which if not detected and cleared would adversely affect the sensitivity of the circuit. Protection against a grounded neutral is provided as follows.

The coupling transformer T-2 including the toroid 24 having a winding 88 is connected to the output 61 of the operational amplifier stage of chip 50, by means of a feedback circuit. A conductor 90 extends from the winding 88 to the junction 74 to receive an output from the terminal 61 of the chip 50. A capacitor 92 is connected in series in the conductor 90 to complete a regenerative feedback path from the output stage of the chip 50 to the transformer winding 88. The other terminal of the winding 88 is connected through conductor to a terminal 94 of the secondary winding 34 on the toroid 22 of the differential the transformer T-1.

The transformer T-2 and the circuit in which it is connected are quiescent when conditions in the power line circuit are normal and no ground is present on the conductor N1 at the load side of the transformer T-2. However, if the neutral wire N1 is grounded on the load side of the toroids 22 and 24 through an impedance of four ohms or less, a feedback circuit exists through the one turn loop created by neutral wire N1 passing through both toroids 22 and 24, which thereby magnetically couples the transformers T-1 and T-2. This feedback loop causes the operational amplifier stage of the chip 50 to oscillate. Such oscillation is detected by the internal level detector stage in the chip 50 in the same manner as a signal voltage resulting from occurrence of a ground fault. An output voltage thereupon appears on the pin 63 of the level detector stage of the chip 50, which gates the SCR 80 into conduction thereby causing the trip coil 44 to open the contacts 26 and 30, with a snap action and interrupt the circuit.

The circuit and components described above, will therefore interrupt the power line circuit both on occurrence of a ground fault on the load side of the toroids 22 and 24 and an occurrence of a grounded neutral N1 on the load side of toroids 22 and 24.

In FIGS. 5-8 as well as in FIGS. 3 and 4 a snap acting, resetable latch switching mechanism as may be used in a GFCI Plug-In Receptacle module of the type disclosed in Draper et al patent, is shown. The mechanism shown is mechanically trip free and thus tease proof with the components of the mechanism arranged so that the switching contacts move with a snap action when the device is tripped or when a reset button is operated. The mechanism is trip-free in that the contacts cannot be prevented from moving from a circuit closing state by an external means. That is the contacts cannot be maintained closed when the reset button is maintained in a depressed condition as when it is or held in a depressed position by an outside force. As the mechanism is tease-proof, the electronics and disconnect mechanism may be powered on the load side of the power clearing contacts so that when the unit is tripped, in response to a ground fault, power is immediately removed from the module.

In FIGS. 7 and 8, the components of a latch mechanism 100 for controlling the operation of snap acting movable contacts 26 and 30 are shown in a reset position with the contacts 26 and 30 closed. During periods when the components of the mechanism are in a reset position and a solenoid 102 is de-energized, a solenoid return spring 104 biases a latch 106 to the left where the latch 106 is engaged by a shoulder 108 on an inner wall of a button slide 110. Also when the component parts are in the reset position, a pair of stops 112 on the button slide 110 are positioned against the rear wall of a middle housing part 114. When the button slide 110 is thus positioned, toggle springs 116 reacting between button slide 110 and a movable contact carrier 118 position the carrier 118 in a position where movable contacts 26 and 30 carried by the carrier 118 engage stationary contacts 120. Further when the latch mechanism is reset, a reset spring 122 will position a stem 124 and a reset button 126 secured on the upper end of the stem 124, in a position where a stop surface 128 on the reset button 126 is spaced from an underside of a cover 130 for the mechanism.

Upon detection of a ground fault, the solenoid 102 is energized and moves the latch 106 to the right against the force exerted by the spring 104 to a position where it is disengaged from the shoulder 108. The release of the latch 106 from the shoulder 108 permits the stem 124 and the reset button 126 to move upwardly in response to a force exerted by a spring 132 to a position where the stop surface 128 on the underside of the button 126 engages the bottom surface of the cover 130 to indicate that the mechanism 100 is in a tripped state. The released engagement between the latch 106 and shoulder 108 also permits the button slide 110 to move downwardly in response to a force exerted by the reset spring 132. The downward movement of the button slide 110 causes the toggle springs 116 to move the movable contact carrier 118 upwardly with a snap-action movement to a position where movable contacts 26 and 30 are separated from the stationary contacts 120.

Resetting of the latch components from their tripped positions is accomplished with the solenoid 102 de-energized by moving the reset button 126 and the stem 124 downwardly. The downward movement of the stem 124 causes the latch 106 to move downwardly in slots 134 provided in a latch guide 136 (as in FIG. 6) to a position where the latch 106 is positioned beneath the shoulder 108. The downward movement of the reset button 126 also causes the rear surface on the button 126 to engage the button slide 110 and move the button slide 110 downwardly which causes the toggle springs 116 to move the contact carrier 118 upwardly with a snap action to a position where the movable contacts 26 and 30 are spaced from the stationary contacts 120 as long as the resetting force on the reset button 126 is maintained and thus provides the mechanism 100 with the trip free function. The components of the mechanism 100 move to the reset position when the force on the reset button 126 is removed which permits the stem 124 and the latch 106 to move the button slide 110 upwardly to a position where the stops 112 on the button slide 110 again engage a lower surface on the middle housing part 114 and the parts are in the reset position as previously described whereat the movable contacts 26 and 30 engage a stationary contacts 112.

If the reset button 126 is depressed while the latch mechanism is reset, that is, when the latch 106 engages the shoulder 108, the mechanism will operate like a snap switch. The contacts 26 and 30 separate from the contacts 120 with a snap action midway during the down stroke of the button 126 and the stem 124. The contacts 26 and 30 move into engagement with the stationary contacts 120 with a snap action when the depressing force is removed from the reset button 126. When the device is operated as a snap action switch, the initial depression of the reset button 126 will cause the stem 124 and the latch 106 to move downwardly a short distance before the reset button 126 engages the upper end of the slide 110. A further downward movement of the button 126 will cause the button slide 110 and the toggle springs 116 to operate and cause the contact carrier 118 to move with a snap action to a position whereat the movable contacts 26 and 30 are spaced from the stationary contacts 120. During the movement of the latch 106 in a downward direction, the latch 106 moves in the slots 134 in the latch guide plate 136.

As shown in FIGS. 7 and 8 the button 126 is secured to the upper end of the stem 124 and the spring 132 surrounds the upper end of the stem 124. The spring 132 has its opposite ends positioned in recesses 126a and 110a in the button 126 and button slide respectively. The stem 124 extends through a suitable passage 110b in the button slide 110 to an annular collar 124a. The collar 124a provides a seat for one end of the reset spring 132 that has its other end positioned on a bottom or rear wall of the housing 144 for the GFCI-10 and surrounds an end 124b that extends rearwardly of the collar 124a. An annular groove 124c encircles the collar 124a.

The latch mechanism 100 includes the collar 124a on the stem 124, the latch 106, the latch guide 136, the plunger 138 portion of the solenoid 102 and the spring 104. Referring to FIGS. 5, 6 and 8 the latch 106 in the embodiment disclosed is a U-shaped wire-like member having a rounded bight portion 106a and a pair of arms 106b slideably received on the groove 124c and extending from the bight portion 106a to divergent ends 106c that extend in opposite directions. The spring 104 surrounds a portion of the plunger 138 and is portioned between the latch guide 136 and a portion of the exterior of the solenoid 102 surrounding the plunger 138. The latch guide 136 is secured to the free end of the plunger 136 and thereby entraps the spring 104 between the latch guide 136 and the solenoid 102. The latch guide 136 is formed as a flat metal piece generally rectangular in shape and includes a central opening 136a into which a free end on the plunger 138 extends where it is peened to secure the latch guide 136 to the plunger 138. The guide 136 is provided with the pair of parallel slots 134 that are L shaped and spaced equidistantly at opposite sides of the opening 136a with the feet portions 136b of the pair of slots 136 extending toward each other. The latch 106 is formed of wire-like material so the arms 106b, when compressed toward each other, will position the divergent ends 106c for passage through the feet portions 136b. When the latch 106 is thus positioned in the slots 134, the divergent ends 106c will be positioned at the rear side of the latch guide 136 as arm portions 106b extend through leg portions 134c of the slots 134. Thus it is apparent that the integrity of the connection between the latch 106 and the collar 124a as well as the connection between the latch 106 and the latch guide 136 will be maintained regardless of the relative positions of the button slide 110 and the solenoid plunger 138.

It can be seen that the presence of the slots 134 in the latch guide 136 permit the latch 106 to move vertically relative to the solenoid 102 while maintaining an operative connection between the latch 106 and the latch guide 136. As shown the latch guide 136 is secured to a free end of a solenoid plunger 138 and the spring 104 surrounds the plunger 138.

As shown in FIG. 1 the GFCI also includes a button designated as a Test button 140. The button 140 actuates normally open switching contacts 140a as in FIG. 2 which close when the button 140 is depressed. The contacts 140a and a resistor 142 are connected in series between the line conductor 11 and the neutral conductor N1 between the source side of the contacts 26 and the load side of the toroid 24.

The transformer T-2 and the circuit in which it is connected are quiescent when conditions in the power line circuit are normal and no ground is present on the conductor N1 at the load side of the transformer T-2 and the switch 140 is not depressed and contacts 140a are open. When the contacts 140a are closed, a feedback circuit including the resistor 142 exists through the one turn loop created by the conductor L1 passing through both toroids 22 and 24, which thereby magnetically couples the transformers T-1 and T-2. This feedback loop causes the operational amplifier stage of the chip 50 to oscillate. Such oscillation is detected by the internal level detector stage in the chip 50 in the same manner as a signal voltage resulting from occurrence of a ground fault. An output voltage thereupon appears on the pin 63 of the level detector stage of the chip 50, which gates the SCR 80 into conduction thereby causing the trip coil 44 to open the contacts 26 and 30, with a snap action and interrupt the circuit. When the devices 10 is tested, the button 126 moves to the tripped position whereat the stop surfaces 128 engage the under side of the cover 130.

While certain preferred embodiments of the invention have been specifically disclosed, it is understood that the invention is not limited thereto, as many variations will be readily apparent to those skilled in the art and the invention is to be given its broadest possible interpretation within the terms of the following claims.

We claim:

1. A protective device adapted to be connected in a power distribution system with the system having a neutral conductor and at least one line conductor carrying current between an A.C. source and a load comprising:

ground fault sensing means coupled to the conductors for monitoring current in the conductors and producing an output signal when the total current in the line conductors is not equal to the current in the neutral conductor;

an over center toggle for interrupting circuits including the conductors; and, means responsive to said output signal for operating said over center toggle so as to interrupt said circuits.

2. The protective device as recited in claim 1 wherein said over center toggle operates snap-acting contacts which are located to interrupt a circuit between the source and the means producing the output signal.

3. The protective device as recited in claim 1 wherein said said over center toggle may interrupt said circuits at any position of a reset button thereby providing a trip-free mechanism.

4. The protective device as recited in claim 1 wherein said over center toggle includes double pole contacts.

5. The protective device as recited in claim 1 wherein said over center toggle interrupts contacts connected between the source and the remaining electrical and electronic components of the device.

6. The protective device as recited in claim 1 wherein said over center toggle may operate contacts for interrupting the circuits including a line and the neutral conductors in response to an output signal.

7. The protective device as recited in claim 6 wherein said over center toggle may make and break a circuit through a line conductor.

8. A ground fault protective device for use with an electric distribution system having line and neutral conductors carrying current between an A.C. source and an electric load with the neutral conductor connected to ground at the source, comprising:

a differential transformer having a plurality of primary windings and a secondary winding, said primary windings being connected in series with the conductors of the distribution system and arranged to produce a fault signal in the secondary winding when currents in the line and neutral conductors are unequal, an over center toggle switch mechanism providing a plurality of switching contacts in series in each conductor between the source and the load;

and means connected to junctions located between the contacts and the load for causing the contacts to operate to interrupt the circuit through the conductors in response to a fault signal.

9. The device as recited in claim 8 wherein the over center toggle includes a mechanism for selectively moving the contacts to circuit closing and opening positions with a snap action.

10. The device as recited in claim 1 wherein said over center toggle includes a plunger that is movable between two positions for moving the contacts between the circuit closing and opening positions, a releasable latch member for maintaining the member in a first position and the contacts in a circuit closing position and means for moving the latch to a releasing position in response to a fault signal.

11. A ground fault protective device for use with an electric distribution system having line and neutral conductors carrying current between an A.C. source and an electric load with the neutral conductor connected to ground at the source side of the device, comprising:

a differential transformer having a plurality of primary windings and a secondary winding with the primary windings in series with the conductors of the distribution system and arranged to produce a fault signal in the secondary winding when currents in the line and neutral conductors are unequal, a tease-proof trip-free over center toggle switch mechanism including snap-acting switching contacts connected between the source and primary windings in each conductor, a mechanism for selectively moving the contacts to a circuit closing position and a circuit opening position, means responsive to the fault signal for producing a trip signal when the magnitude of the fault signal exceeds a selected level, means responsive to the trip signal and including a power supply and a relay coil, said means having input terminals connected to the conductors at a junction located between the contacts and the load whereby the power supply and the coil are deenergized when the contacts are open and means including a latch coupled to the contact moving mechanism for maintaining the contacts in the circuit closing position and movable in response to the energization of the coil for moving the latch to a releasing position.

12. A protective device adapted to be connected in a power distribution system with the system having a neutral conductor and at least one line conductor carrying current between an A.C. source and a load comprising:

ground fault sensing means coupled to the conductors for monitoring current in the conductors and producing an output signal when the total current in the line conductors is not equal to the current in the neutral conductor;
at least one electrical contact;
a slide; and,
a spring connecting said slide to said electric contact, said slide having a first position wherein said electric contact is closed and said slide having a second position wherein said electric contact is open, and said spring capable of over center toggle action as said slide moves from said first position to said second position in order that motion of said slide from said first position to said second position be capable of opening said at least one electrical contact with an over center toggle snap action.

13. The protective device as in claim 12 further comprising:
a second spring capable of urging movement of said slide;
a latch for holding said slide in said first position, and said second spring urging said slide toward said second position against said latch, said latch responsive to said ground fault sensing means, and said latch releasing said slide when said output signal is produced by said ground fault sensing means, so that said contact is opened by over center toggle of said spring upon the occurrence of a ground fault.

* * * * *